(12) United States Patent
Manzano et al.

(10) Patent No.: US 11,068,023 B1
(45) Date of Patent: *Jul. 20, 2021

(54) ACCESSORY COUPLING SYSTEM

(71) Applicant: Pioneer Square Brands, Inc., Seattle, WA (US)

(72) Inventors: Megan Elizabeth Zumel Manzano, Seattle, WA (US); Michael Cooper Ferren, Camas, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,742

(22) Filed: Sep. 24, 2020

Related U.S. Application Data

(63) Continuation-in-part of application No. 17/011,921, filed on Sep. 3, 2020.

(51) Int. Cl.
*G06F 1/16* (2006.01)
*G03B 11/04* (2021.01)
*G06F 3/0354* (2013.01)
*G09F 23/00* (2006.01)
*G09F 3/02* (2006.01)

(52) U.S. Cl.
CPC ............ *G06F 1/1607* (2013.01); *G03B 11/04* (2013.01); *G06F 3/03545* (2013.01); *G09F 3/02* (2013.01); *G09F 23/00* (2013.01)

(58) Field of Classification Search
CPC ... G06F 1/1607; G06F 3/03545; G03B 11/04; G09G 3/02; G09F 23/00
USPC .......................................................... 345/679
See application file for complete search history.

(56) References Cited

U.S. PATENT DOCUMENTS

| | | | |
|---|---|---|---|
| 2003/0132292 A1* | 7/2003 | Gomez | G07G 1/0018 235/383 |
| 2008/0123286 A1* | 5/2008 | Watanabe | G06F 1/1635 361/679.27 |
| 2013/0088813 A1* | 4/2013 | Su | G06F 1/1628 361/679.01 |
| 2014/0029183 A1* | 1/2014 | Ashcraft | H02J 50/90 361/679.4 |
| 2018/0123631 A1* | 5/2018 | Hessabi | H04B 1/3888 |
| 2020/0026387 A1* | 1/2020 | Barel | G06F 3/044 |

* cited by examiner

*Primary Examiner* — Kent W Chang
*Assistant Examiner* — Sujit Shah
(74) *Attorney, Agent, or Firm* — Grandview Law

(57) ABSTRACT

Systems and methods are involved with but are not limited to an apparatus including an accessory coupling system to couple at least one accessory to at least one computing device case portion wherein the accessory coupling system includes at least one connection portion being affixed with the computing device case portion; and an engagement component, which includes at least one engagement projection being couplable with the at least one connection portion affixed with the computing device case portion. In addition, other aspects are described in the claims, drawings, and text forming a part of the present disclosure.

20 Claims, 15 Drawing Sheets

ACCESSORY COUPLING SYSTEM

SUMMARY

In one or more aspects, an apparatus can include, but is not limited to an accessory coupling system can couple at least one accessory (such as a stylus coupling assembly or a label assembly or a camera privacy assembly) to computing device case portion. The accessory coupling system can include connection portion, which can be affixed with the computing device case portion; and can include an engagement component, which can include engagement projection. The engagement projection can be couplable with the connection portion, which can be affixed with the computing device case portion. The connection portion can be affixed with the computing device case portion by being molded with the computing device case portion with the material of the connection portion being of the material of the computing device case portion. The connection portion can be affixed with the computing device case portion by being co-molded with the computing device case portion with the material of the connection portion being different than the material of the computing device case portion. The connection portion can be affixed with the computing device case portion by being co-molded with the computing device case portion with the material of the connection portion being silicone and the material of the computing device case portion being polycarbonate. The connection portion can be affixed with the computing device case portion by being glued to the computing device case portion with an adhesive glue. The the computing device case portion can include an exterior side surface. The connection portion can be positioned to project from the exterior side surface as a ledge-shaped structure. The connection portion can include connection aperture having a substantially elongated profile. The engagement projection of engagement component can include stem, beveled end of stem, and orthogonal extension, which can extend substantially orthogonally from stem. The stem, beveled end and orthogonal extension of engagement projection of the engagement component can be shaped and positioned to couple with connection aperture of connection portion by or more portions of stem of beveled end. The orthogonal extension can be capable of passing at least partially into connection aperture of connection portion. The accessory coupling system can include stylus retention component, which can include elongated hollow member being sized and shaped to receive stylus-shaped computer input device and engagement component can be coupled to the stylus retention component. The elongated hollow member of the stylus retention component can include receiving aperture being sized and shaped to receive engagement projection of engagement component for coupling of stylus retention component with engagement component. The accessory coupling system can include label assembly, which can label member, which can include label surface. The label surface can be sized and shaped for presentation including but not limited to alpha-numeric characters. The label member can be coupled with engagement projection. The label member can be molded with engagement projection as a single piece. The accessory coupling system can include camera privacy assembly, which can include privacy panel. The privacy panel can be coupled to and can extend substantially perpendicular from engagement projection. The privacy panel can include sliding cover. The privacy panel can be coupled to and extend substantially perpendicular to engagement projection. The connection portion can be made from material having a property of hardness that can be measured to be no greater than a first hardness measurement value and engagement component can be made from material having a property of hardness that can be measured to be no smaller than a second hardness measurement value, the first hardness measurement value being smaller than the second hardness measurement value. The computing device case portion can be for coupling with engagement component. The engagement component can include engagement projection. The computing device case portion can include connection portion; and exterior side surface. The connection portion can be positioned to project from the exterior side surface as a ledge-shaped structure to couple with the engagement component. The connection portion can include connection aperture, which can have a substantially elongated profile to receive engagement projection for coupling with the engagement component. The engagement component can be for coupling with connection aperture of a computing device case portion. The engagement component can include engagement projection, which can include stem, beveled end of stem, and orthogonal extension, which can extend substantially orthogonally from stem. The engagement projection can be sized and shaped to be couplable with connection aperture of the computing device case portion. The stem, beveled end and orthogonal extension of engagement projection of the engagement component can be shaped and positioned to couple with connection aperture of connection portion by portions of stem, of beveled end and orthogonal extension being capable of passing at least partially into connection aperture of connection portion.

In one or more aspects an apparatus can include, but is not limited to a computing device case portion can be for coupling with engagement component. The engagement component can include engagement projection. The computing device case portion can include connection portion; and exterior side surface. The connection portion can be positioned to project from the exterior side surface as a ledge-shaped structure to couple with the engagement component. The connection portion can include connection aperture, which can have a substantially elongated profile to receive engagement projection for coupling with the engagement component.

In one or more aspects, an apparatus can include, but is not limited to an engagement component can be for coupling with connection aperture of a computing device case portion. The engagement component can include engagement projection, which can include stem, beveled end of stem, and orthogonal extension, which can extend substantially orthogonally from stem. The engagement projection can be sized and shaped to be couplable with connection aperture of the computing device case portion. The stem, beveled end and orthogonal extension of engagement projection of the engagement component can be shaped and positioned to couple with connection aperture of connection portion by portions of stem, of beveled end and orthogonal extension being capable of passing at least partially into connection aperture of connection portion.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of an accessory coupling system articles of manufacture, compositions of matter, systems for producing and/or methods for producing same that may provide context, for instance, in introducing one or more processes and/or devices described herein.

DETAILED DESCRIPTION

Figure 1:
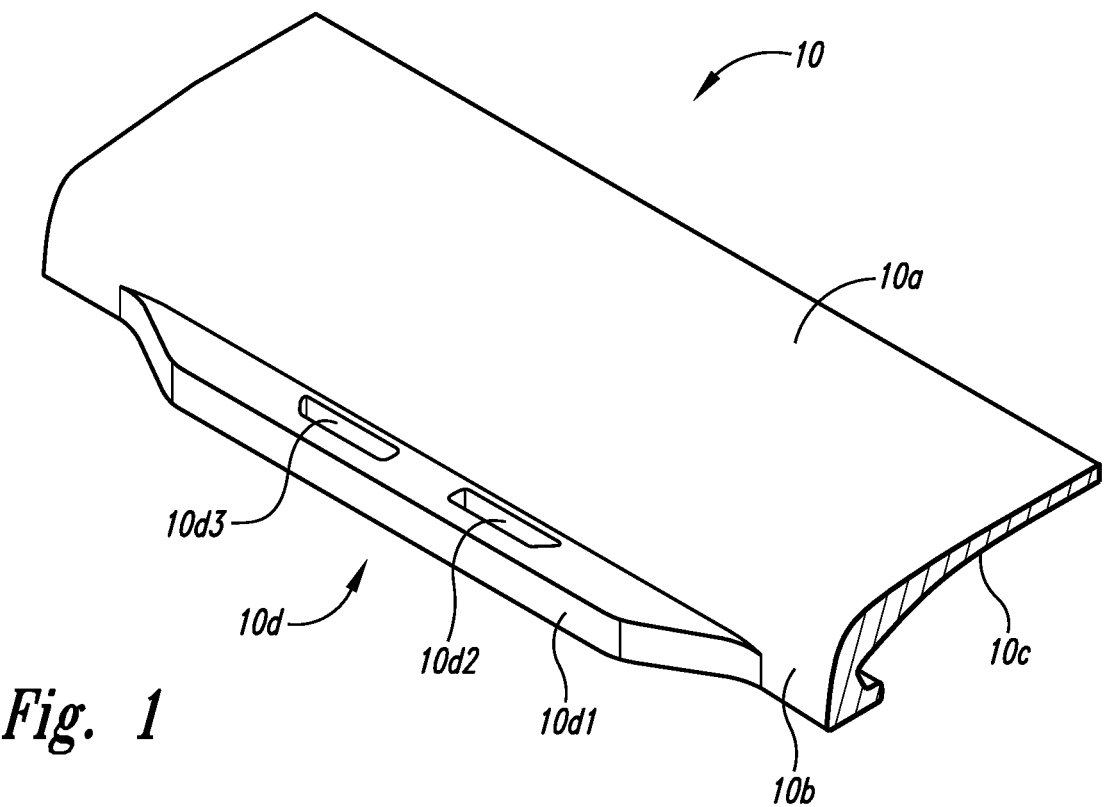
FIG. 1 is a top perspective view of a computing device case portion including a connection portion.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of a computing device case portion 10.

The computing device case portion 10 is shown to include exterior cover surface 10*a*, exterior side surface 10*b*, interior surface 10*c*, connection portion 10*d*, and engagement projection 18*e*.

The connection portion 10*d* of the computing device case portion 10 is shown to include connection ledge 10*d*1, connection aperture 10*d*2, and connection aperture 10*d*3.

Figure 2:
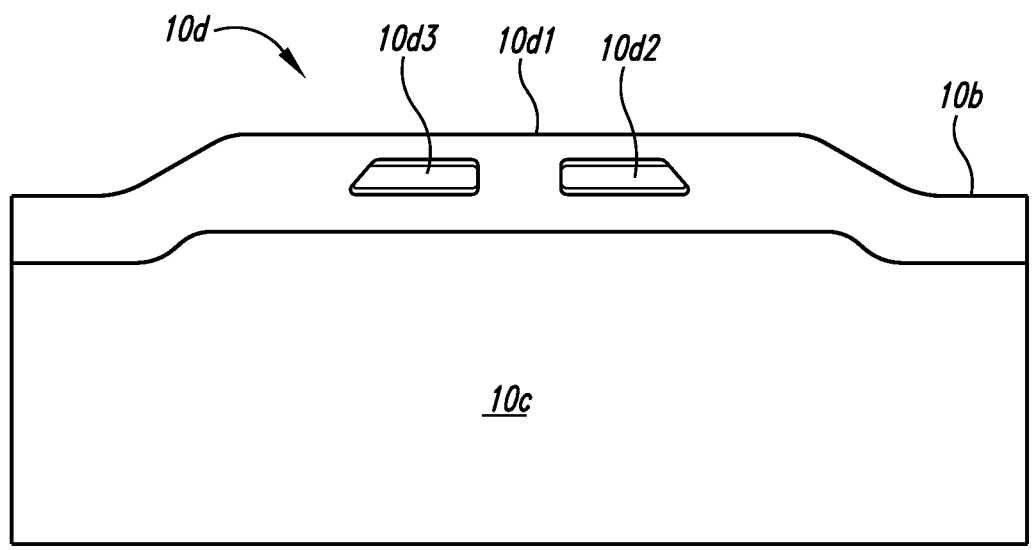
FIG. 2 is a bottom view of the computing device case portion of FIG. 1.

Turning to FIG. 2, depicted therein is a bottom view of the computing device case portion 10 of FIG. 1.

Figure 3:
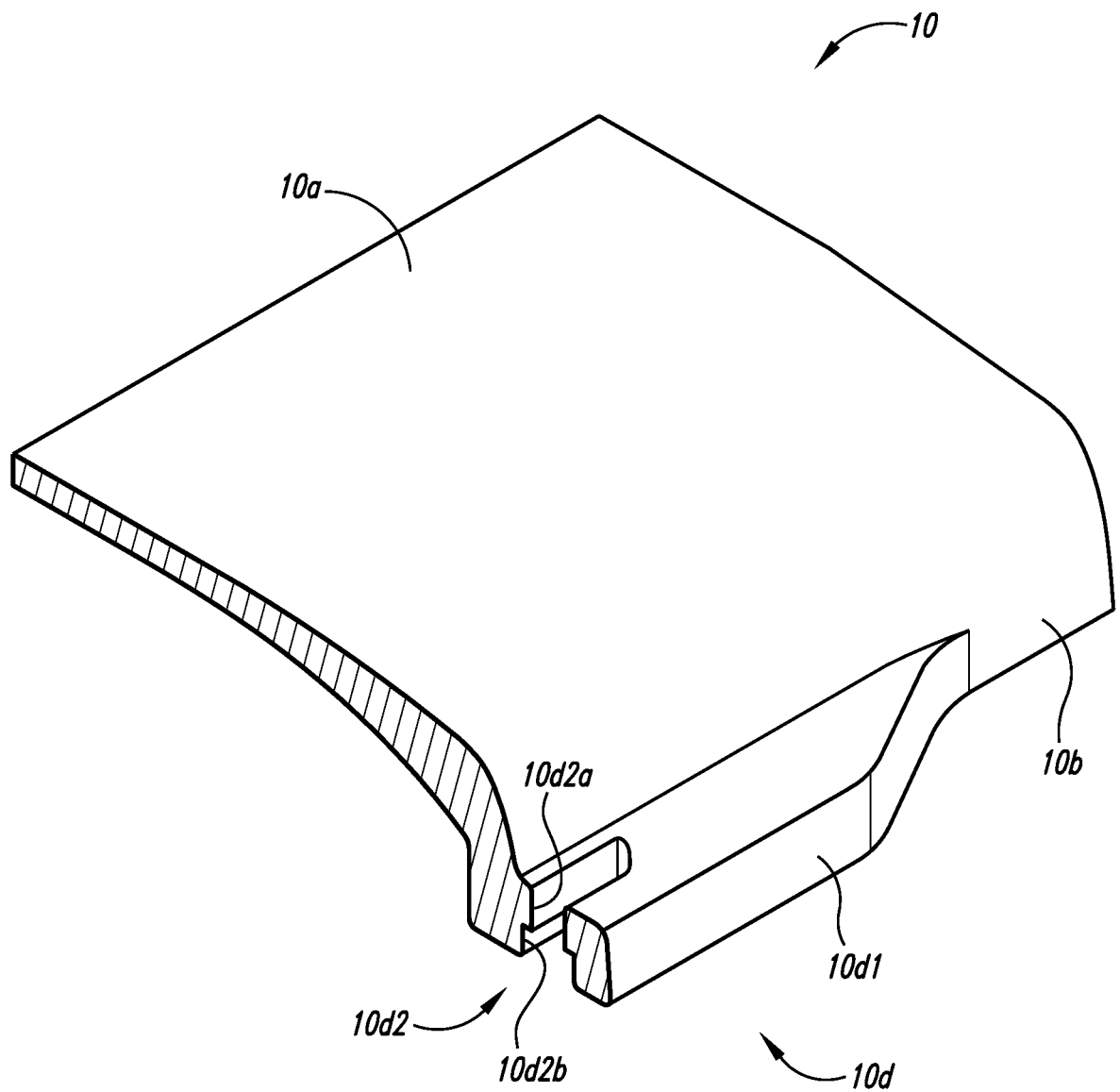
FIG. 3 is a sectional top perspective view of the computing device case portion of FIG. 1.

Turning to FIG. 3, depicted therein is a sectional top perspective view of the computing device case portion 10 of FIG. 1.

The connection aperture 10*d*2 of the connection portion 10*d* of the computing device case portion 10 is shown to include narrow passage 10*d*2*a* and wide passage 10*d*2*b*.

Figure 4:
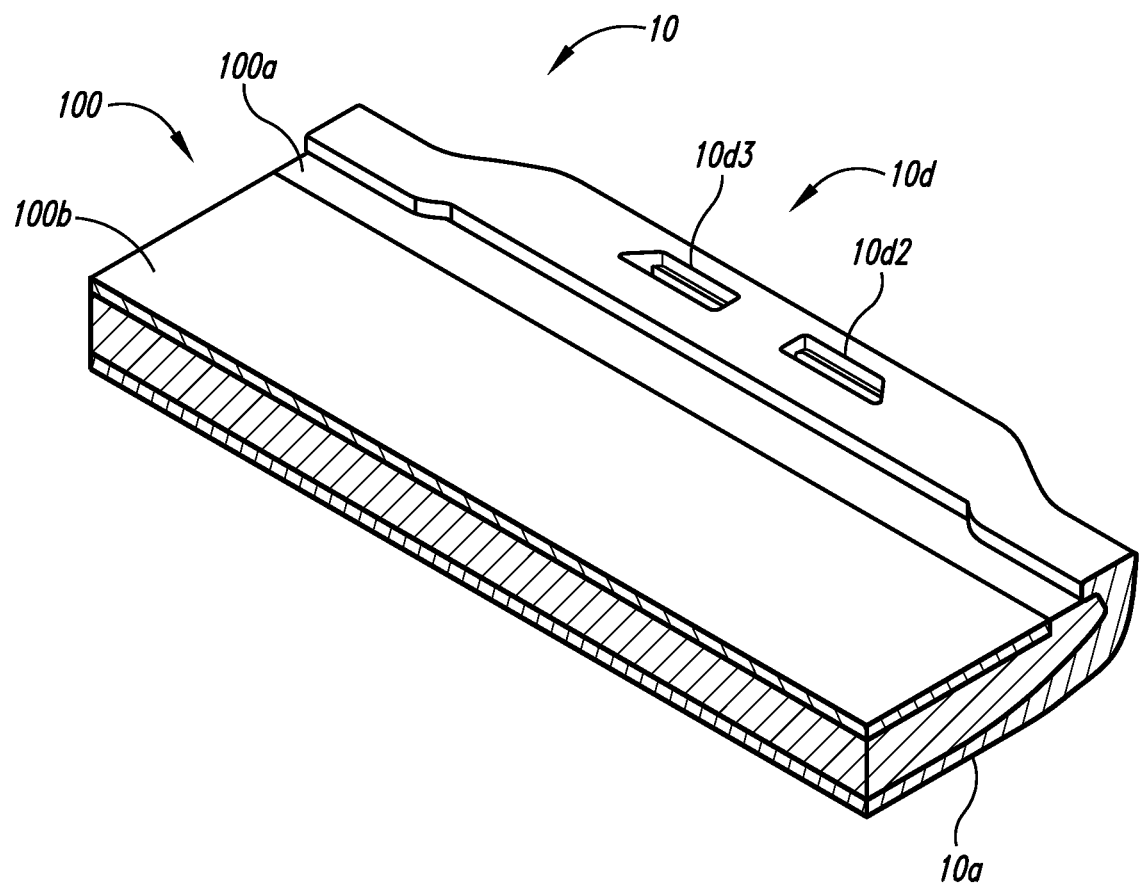
FIG. 4 is a bottom perspective view of the computing device case portion of FIG. 1.

Turning to FIG. 4, depicted therein is a bottom perspective view of the computing device case portion 10 of FIG. 1.

The computing device case portion 10 is shown to be couplable with a portable electronic computing device 100, which includes a peripheral border 100*a* and an exterior surface 100*b*.

Figure 5:
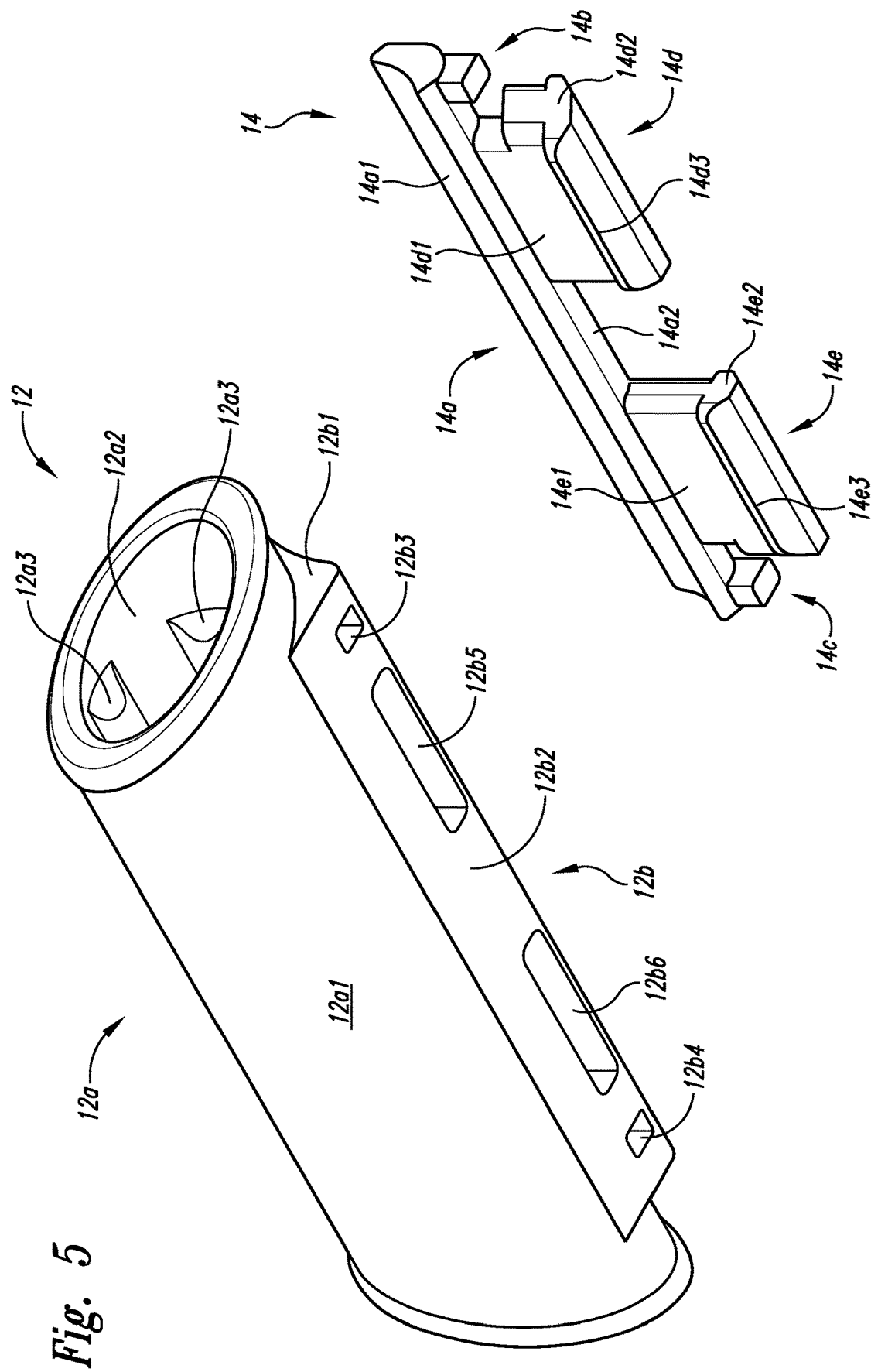
FIG. 5 is a bottom perspective view of a stylus coupling assembly including a stylus retention component and an engagement component.

Turning to FIG. 5, depicted therein is a bottom perspective view of a stylus coupling assembly 11 shown to include a stylus retention component 12 and an engagement component 14.

The stylus retention component 12 of the stylus coupling assembly 11 is shown to include elongated hollow member 12a and receiver portion 12b.

The elongated hollow member 12a of the stylus retention component 12 of the stylus coupling assembly 11 is shown to include opening 12a1, interior surface 12a2, elongated rib member 12a3, and exterior surface 12a4.

The receiver portion 12b of the stylus retention component 12 of the stylus coupling assembly 11 is shown to include contoured extension 12b1, interfacial surface 12b2, guide aperture 12b3, guide aperture 12b4, receiving aperture 12b5, and receiving aperture 12b6.

The engagement component 14 of the stylus coupling assembly 11 is shown to include elongated member 14a, guide peg 14b, guide peg 14c, engagement projection 14d, and engagement projection 14e.

The elongated member 14a of the engagement component 14 of the stylus coupling assembly 11 is shown to include elongated surface 14a1 and interfacial surface 14a2.

The engagement projection 14d of the engagement component 14 of the stylus coupling assembly 11 is shown to include stem 14d1, beveled end 14d2, orthogonal extension 14d3, and notch 14d4

The engagement projection 14e of the engagement component 14 of the stylus coupling assembly 11 is shown to include stem 14e1, beveled end 14e2, orthogonal extension 14e3, and notch 14e4.

Figure 6:
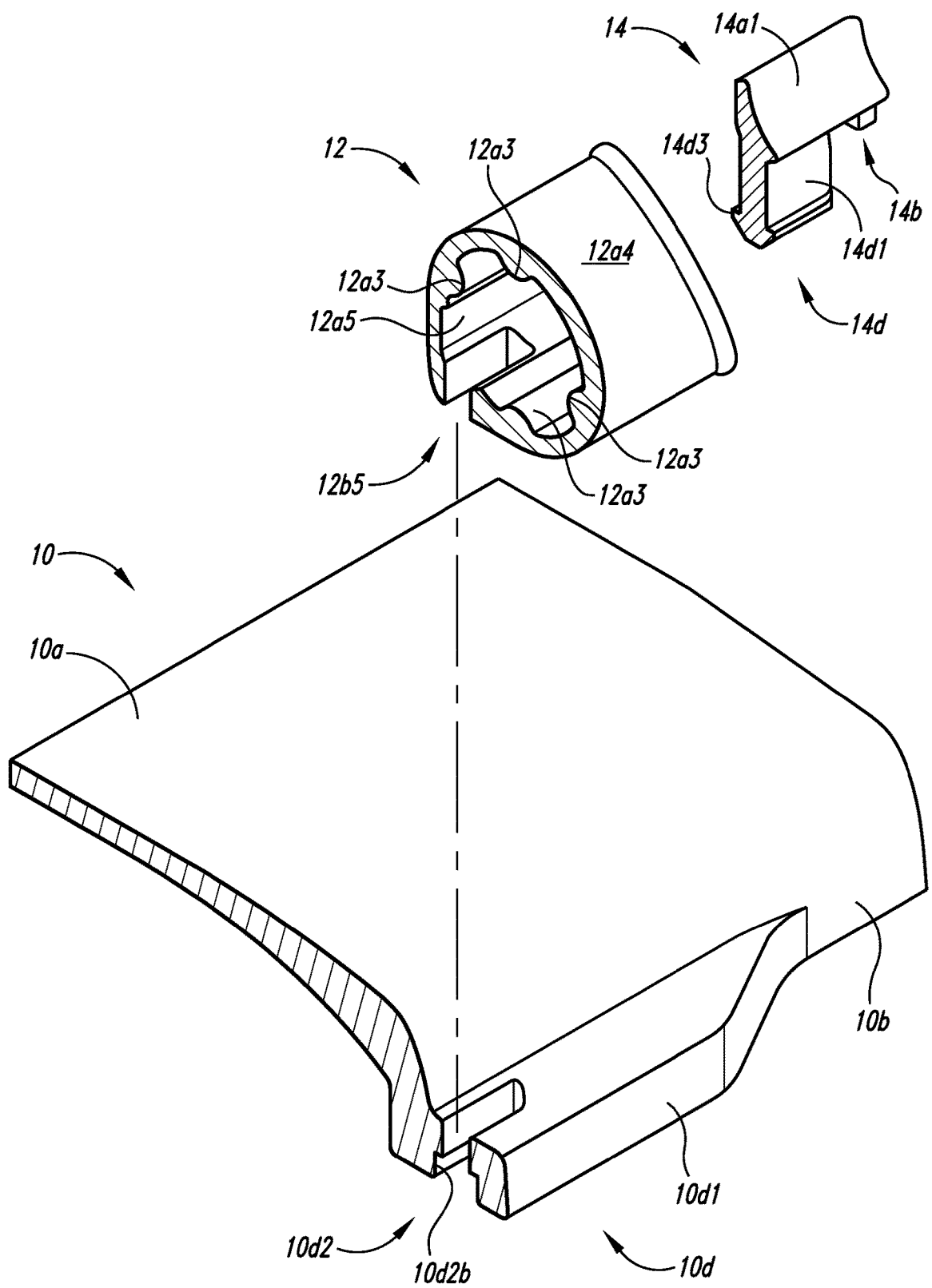
FIG. 6 is a sectional top perspective view of the stylus coupling assembly including the engagement component to be coupled with the stylus retention component and to be coupled with the computing device case portion.

Turning to FIG. 6, depicted therein is a sectional top perspective view of the stylus coupling assembly 11 shown to include the engagement component 14 to be coupled with the stylus retention component 12 and to be coupled with the computing device case portion 10.

The elongated hollow member 12a of the stylus retention component 12 of the stylus coupling assembly 11 is shown to include elongated groove 12a5.

Figure 7:
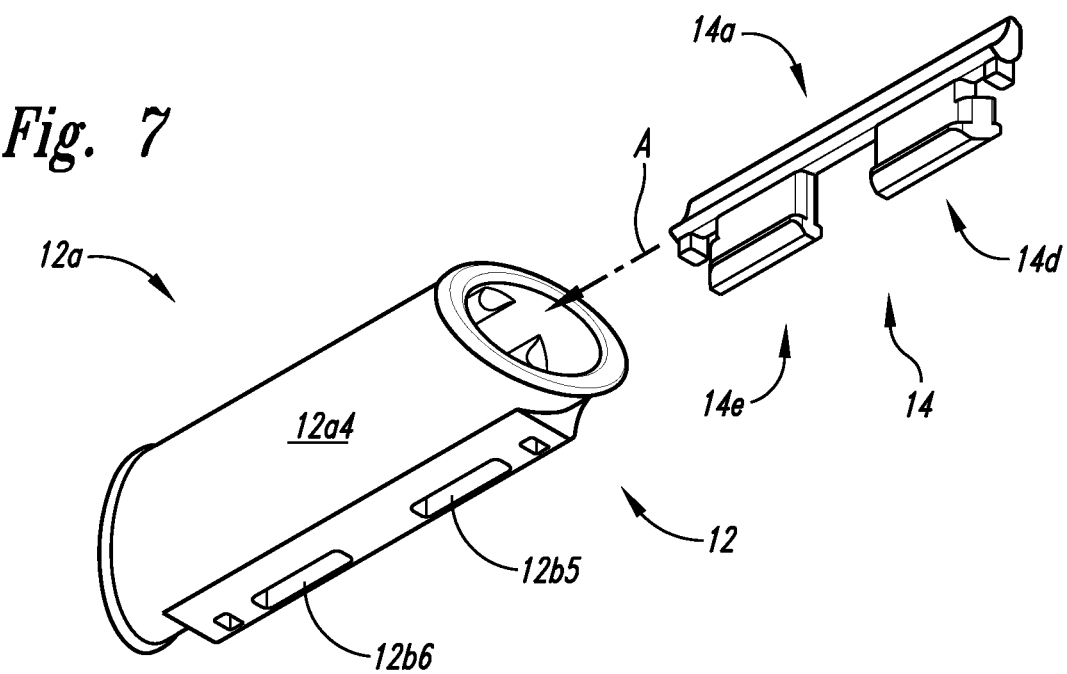
FIG. 7 is a bottom perspective view of the stylus coupling assembly including the stylus retention component and the engagement component to be coupled together.

Turning to FIG. 7, depicted therein is a bottom perspective view of the stylus coupling assembly 11 shown to include the stylus retention component 12 and the engagement component 14 to be coupled together.

Figure 8:
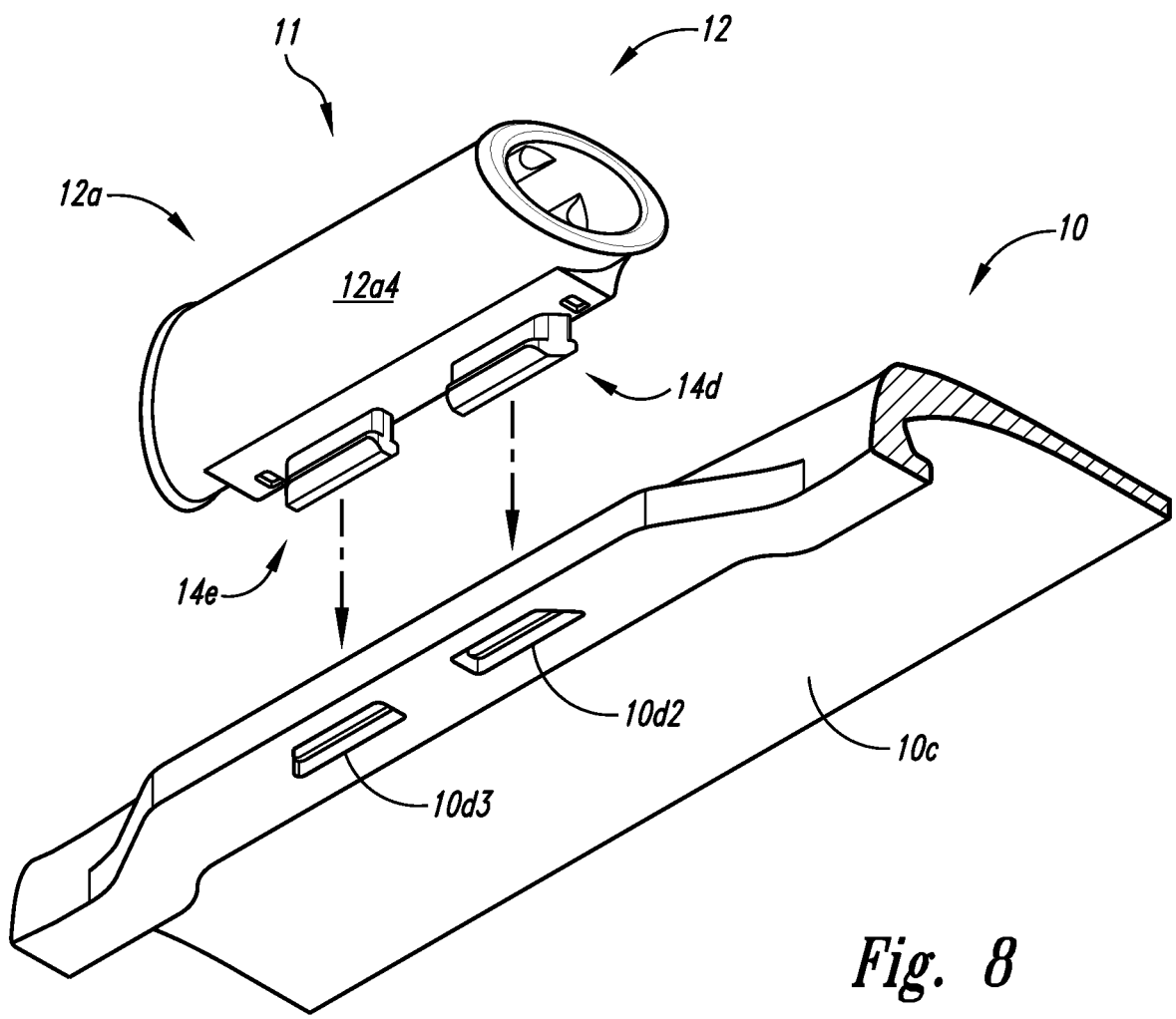
FIG. 8 is a bottom perspective view of the stylus coupling assembly including the stylus retention component and the stylus coupling assembly coupled together and to be coupled with the computing device case portion.

Turning to FIG. 8, depicted therein is a bottom perspective view of the stylus coupling assembly 11 shown to include the stylus retention component 12 and the stylus coupling assembly 11 coupled together and to be coupled with the computing device case portion 10.

Figure 9:
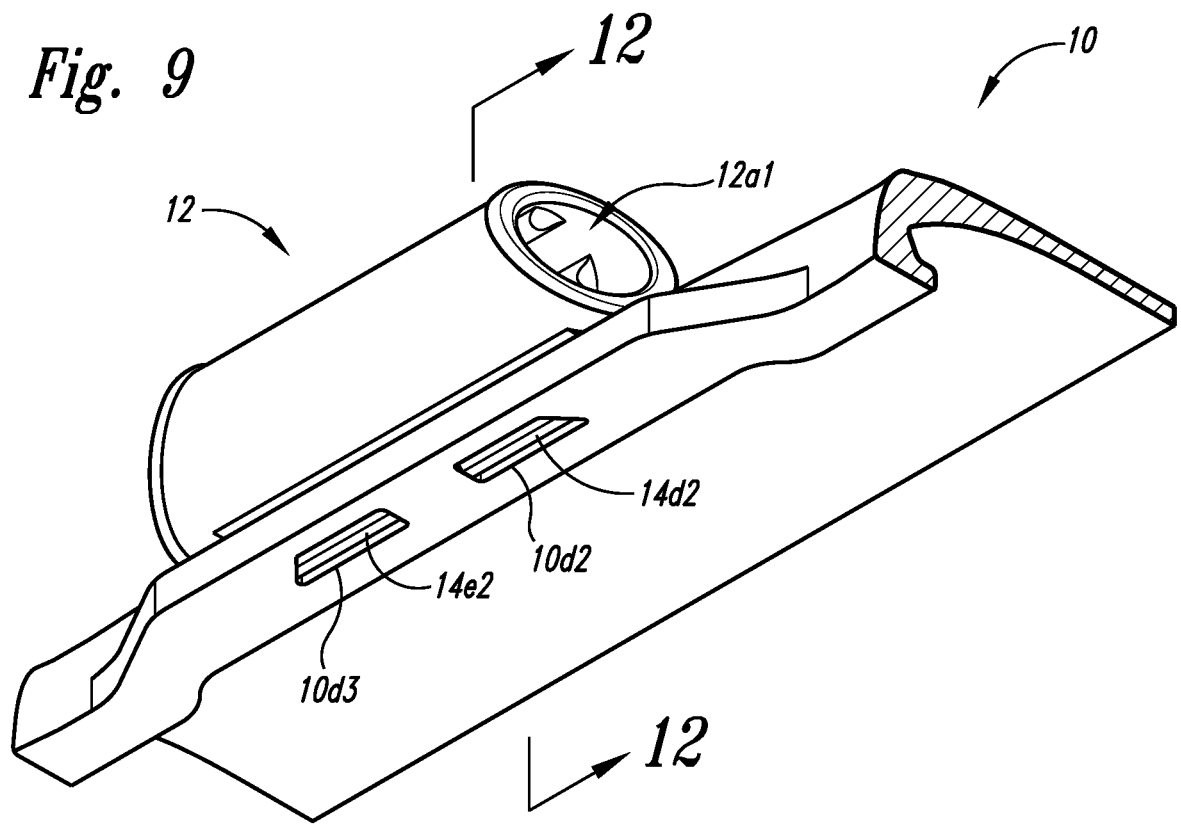
FIG. 9 is a bottom perspective view of the stylus coupling assembly including the stylus retention component and the engagement component coupled together and coupled with the computing device case portion.

Turning to FIG. 9, depicted therein is a bottom perspective view of the stylus coupling assembly 11 shown to include the stylus retention component 12 and the engagement component 14 coupled together and coupled with the computing device case portion 10.

Figure 10:
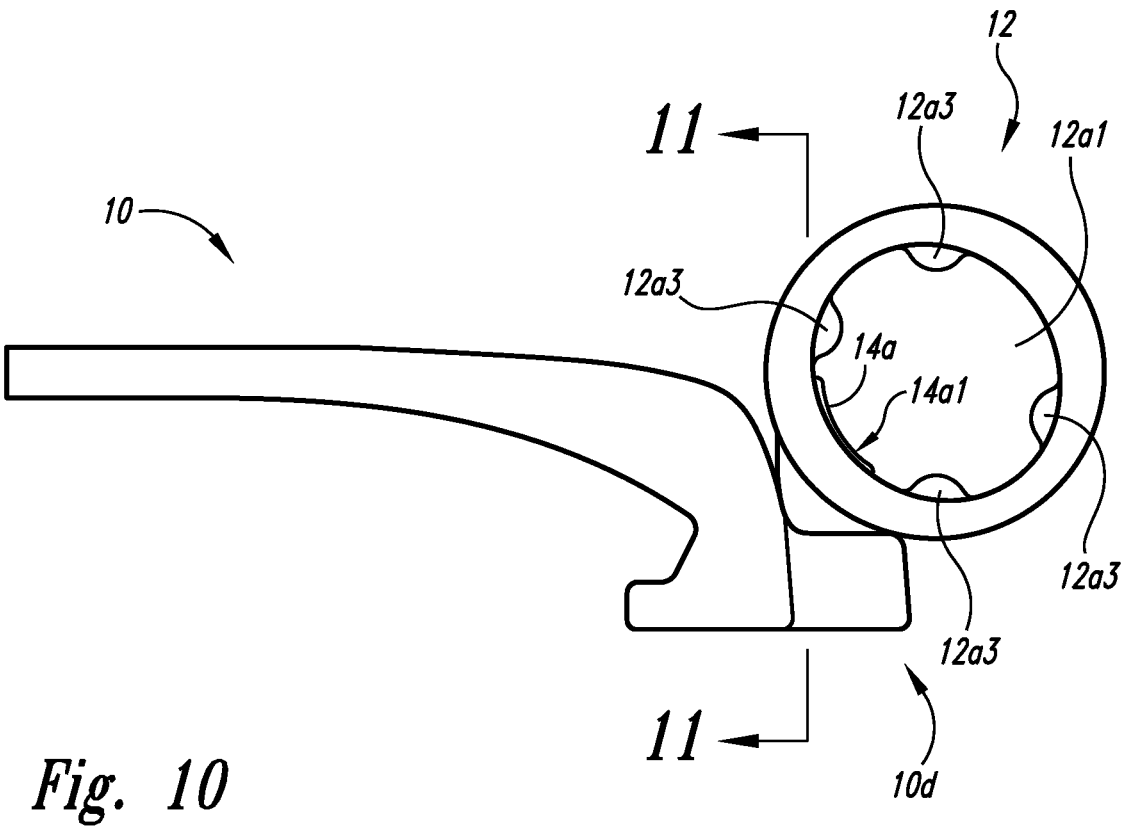
FIG. 10 is a side-elevational view of the stylus coupling assembly including the stylus retention component and the engagement component coupled together and coupled with the computing device case portion.

Turning to FIG. 10, depicted therein is a side-elevational view of the stylus coupling assembly 11 shown to include the stylus retention component 12 and the engagement component 14 coupled together and coupled with the computing device case portion 10.

Figure 11:
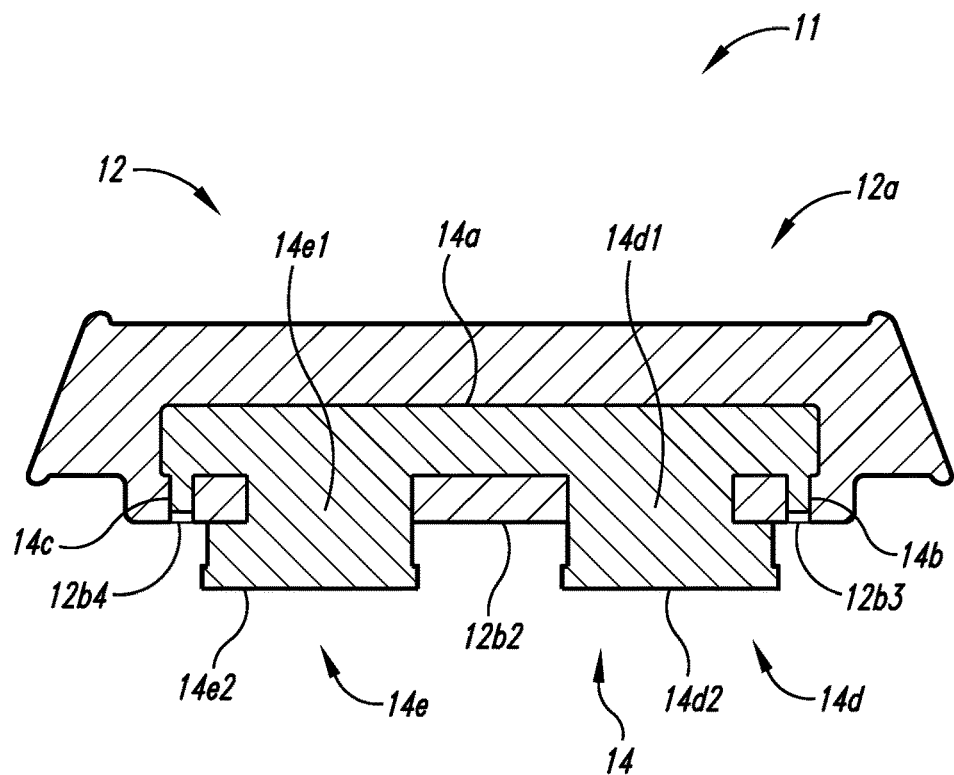
FIG. 11 is a cross-sectional side-elevational view of the stylus coupling assembly including the stylus retention component and the engagement component coupled together and coupled with the computing device case portion taken along the 11-11 cut line of FIG. 10.

Turning to FIG. 11, depicted therein is a cross-sectional side-elevational view of the stylus coupling assembly 11 shown to include the stylus retention component 12 and the engagement component 14 coupled together and coupled with the computing device case portion 10 taken along the 11-11 cut line of FIG. 10.

Figure 12:
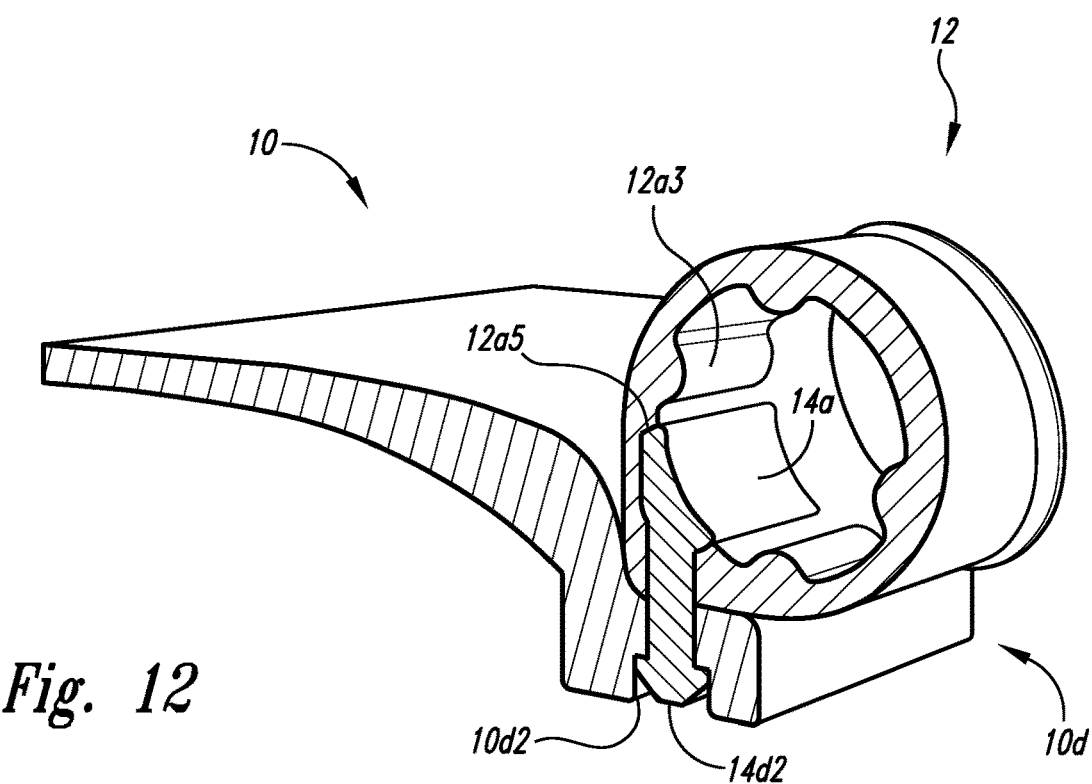
FIG. 12 is a cross-sectional perspective view of the stylus coupling assembly including the stylus retention component and the engagement component coupled together and coupled with the computing device case portion taken along the 12-12 cut line of FIG. 9.

Turning to FIG. 12, depicted therein is a cross-sectional perspective view of the stylus coupling assembly 11 shown to include the stylus retention component 12 and the engagement component 14 coupled together and coupled with the computing device case portion 10 taken along the 12-12 cut line of FIG. 9.

Figure 13:
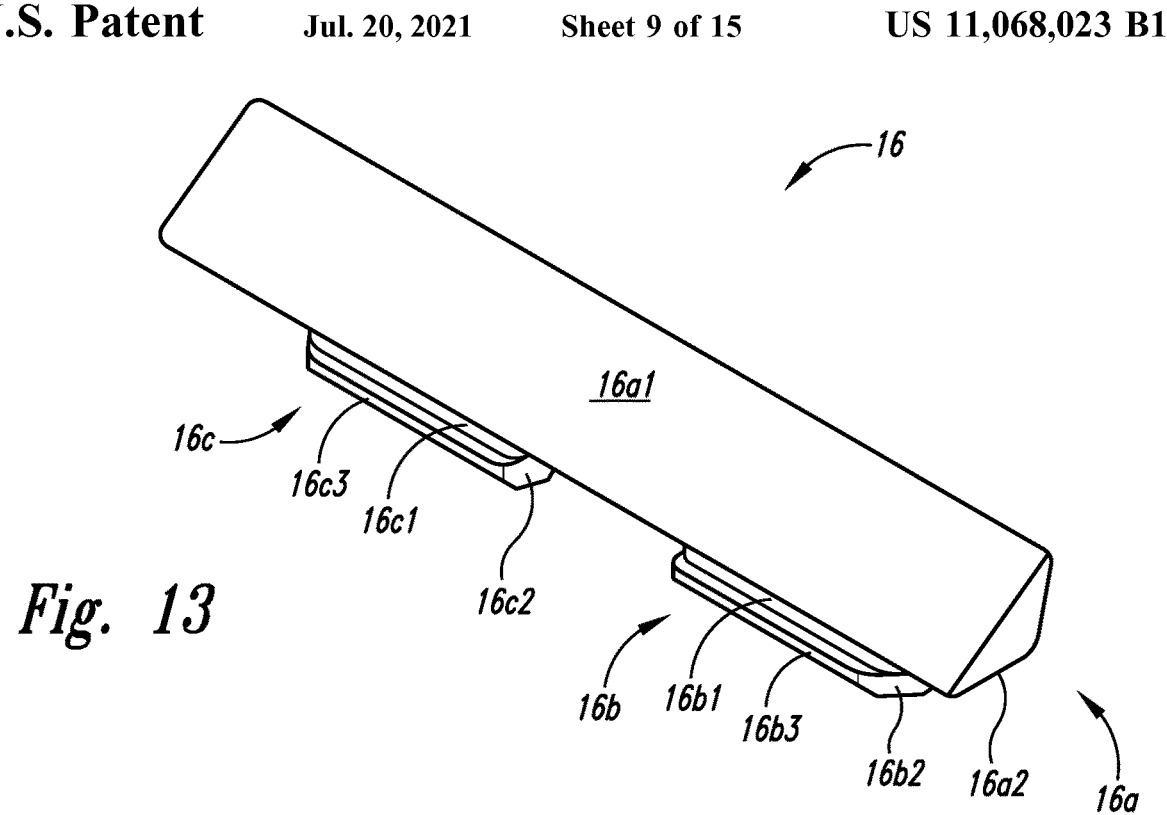
FIG. 13 is a perspective view of a label assembly.
Figure 14:
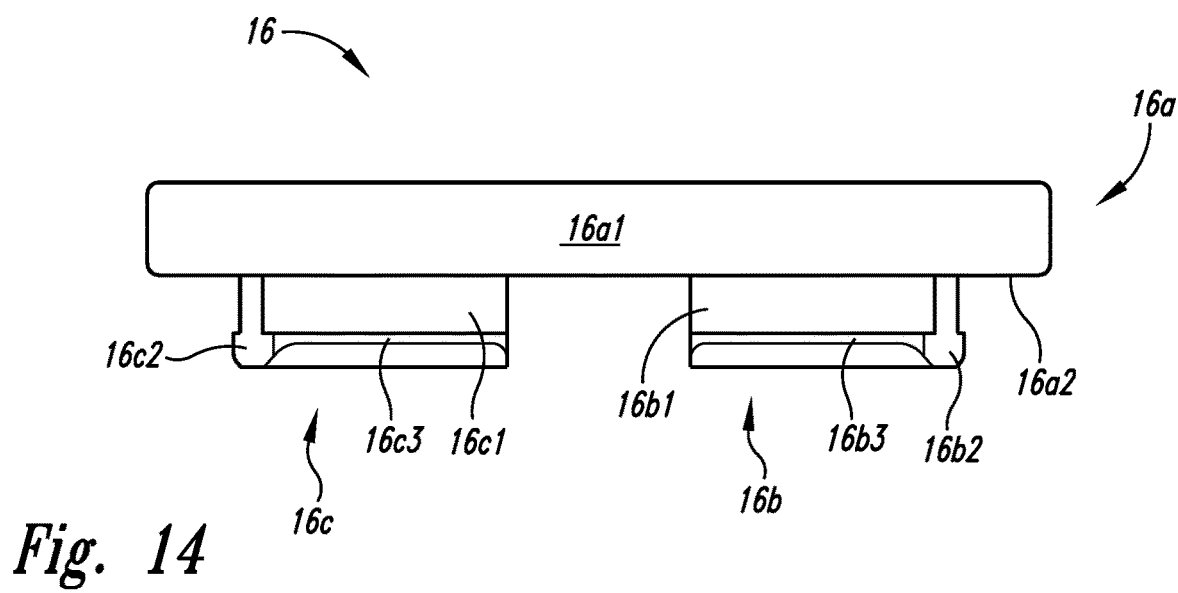
FIG. 14 is a front elevational view of the label assembly of FIG. 13.
Figure 15:
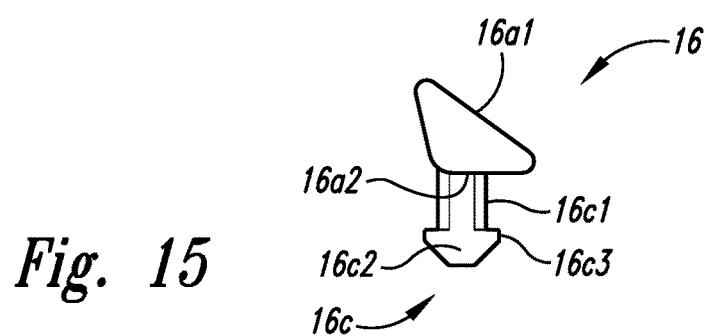
FIG. 15 is a side elevational view of the label assembly of FIG. 13.

Turning to FIG. 13, depicted therein is a perspective view of a label assembly 16 shown to include label member 16a, engagement projection 16b, and engagement projection 16c. The label member 16a is shown to include label surface 16a1 that can be marked with alpha-numeric characters or other symbology and to include base surface 16a2. The engagement projection 16b is shown to extend from the base surface 16a2 of the label member 16a. The engagement projection 16b is shown to include stem 16b1 beveled end 16b2 and orthogonal extension 16b3. The engagement projection 16c is shown to include stem 16c1, beveled end 16c2, and orthogonal extension 16c3. Turning to FIG. 14, depicted therein is a front elevational view of the label assembly 16. Turning to FIG. 15, depicted therein is a side elevational view of the label assembly 16.

Figure 16:
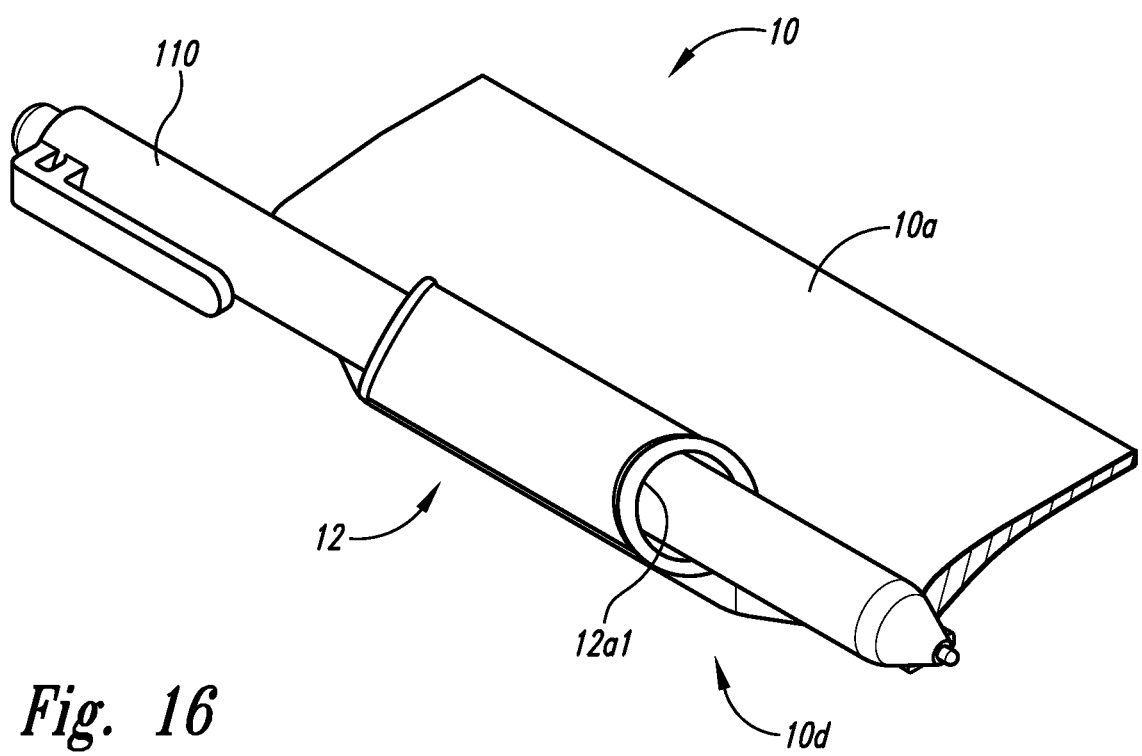
FIG. 16 is a top perspective view of the stylus coupling assembly including the stylus retention component and the engagement component coupled together and coupled with the computing device case portion and with the stylus retention component shown holding a stylus-shaped computer input device.

Turning to FIG. 16, depicted therein is a top perspective view of the stylus coupling assembly 11 shown to include the stylus retention component 12 and the engagement component 14 coupled together and coupled with the computing device case portion 10 and with the stylus retention component 12 shown holding a stylus-shaped computer input device 110.

Figure 17:
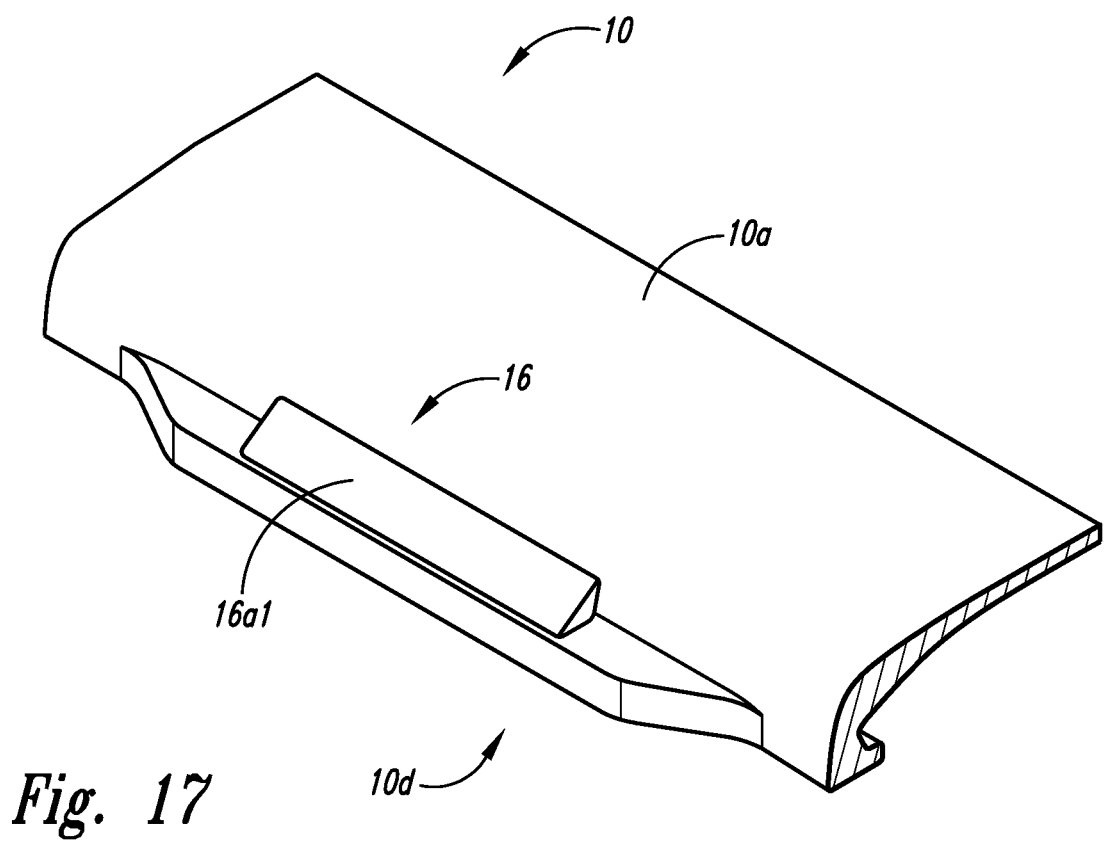
FIG. 17 is a top perspective view of the computing device case portion of FIG. 1 coupled with the label assembly of FIG. 13.

Turning to FIG. 17, depicted therein is a top perspective view of the computing device case portion 10 coupled with label assembly 16 by connection aperture 10d2 and connection aperture 10d3 of the computing device case portion 10 receiving engagement projection 16b and engagement projection 16c of label assembly 16, respectively.

Figure 18:
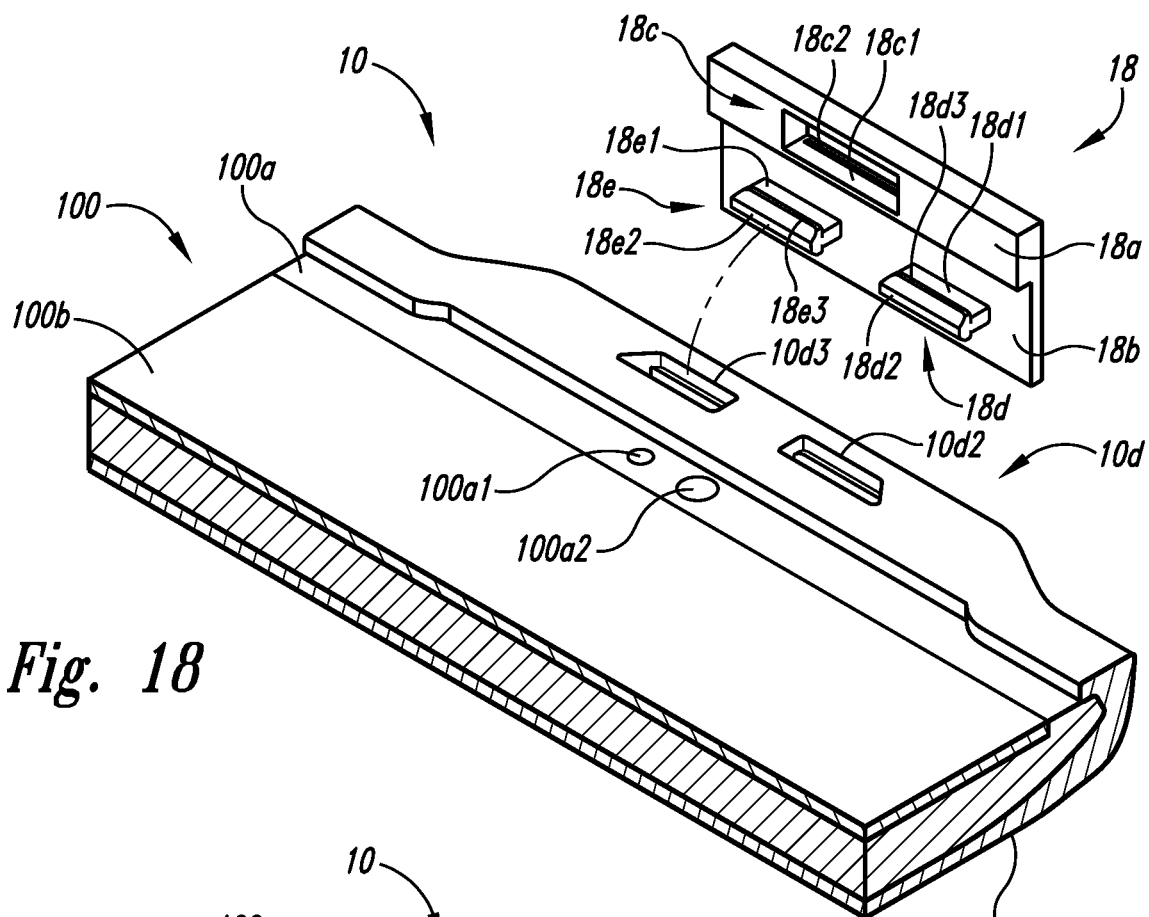
FIG. 18 is a bottom perspective view of the computing device case portion of FIG. 4 with a camera privacy assembly to be coupled therewith.

Turning to FIG. 18, depicted therein is a bottom perspective view of the computing device case portion 10 with a camera privacy assembly 18 to be coupled therewith. The camera privacy assembly 18 is shown to include privacy panel 18a, engagement support 18b, aperture system 18c, engagement projection 18d, and engagement projection 18e. The aperture system 18c is shown to include aperture 18c1 and groove 18c2. The engagement projection 18d is shown to include stem 18d1, beveled end 18d2, and orthogonal extension 18d3. The engagement projection 18e is shown to include stem 18e1, beveled end 18e2, and orthogonal extension 18e3. The peripheral border 100a of portable electronic computing device 100 is shown to include audio microphone 100a1 and camera 100a2.

Figure 19:
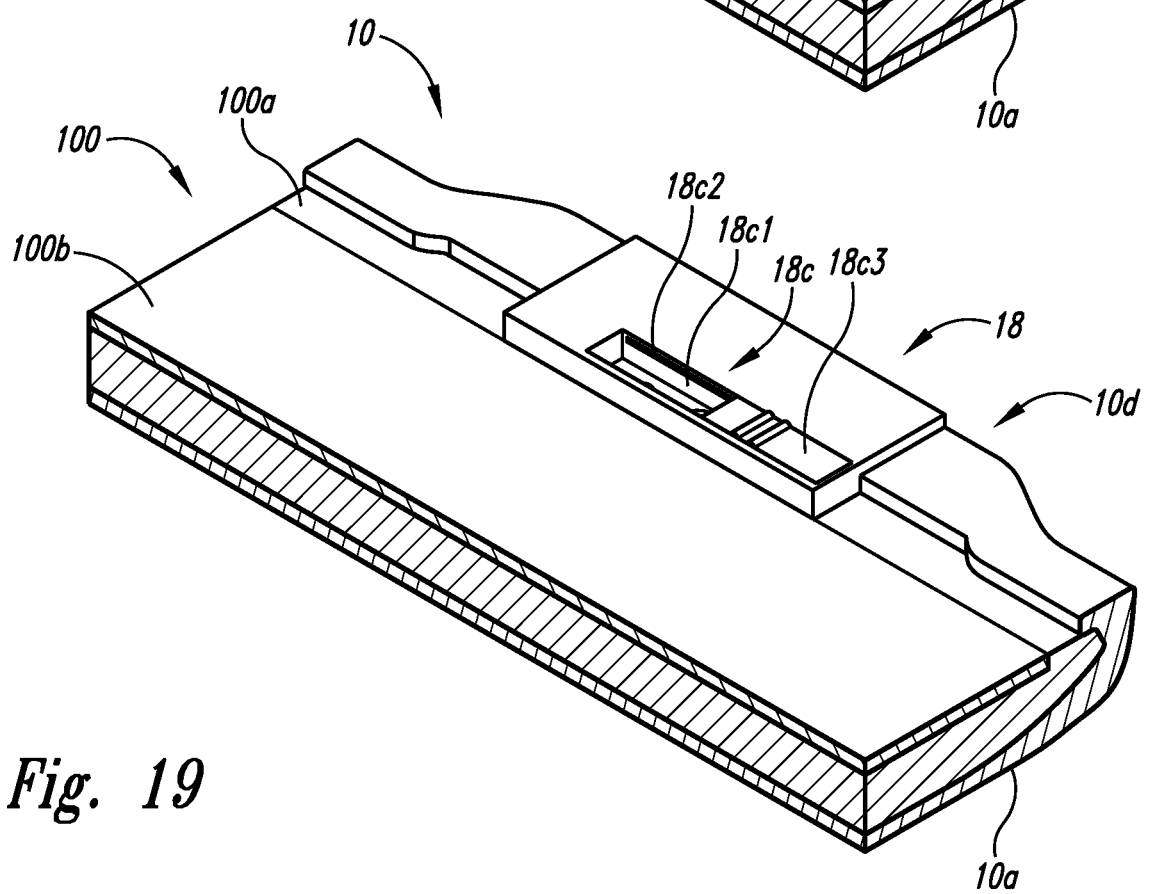
FIG. 19 is a bottom perspective view of the computing device case portion of FIG. 4 with a camera privacy assembly of FIG. 18 coupled therewith with a sliding cover 18c3 in an open position.
Figure 20:
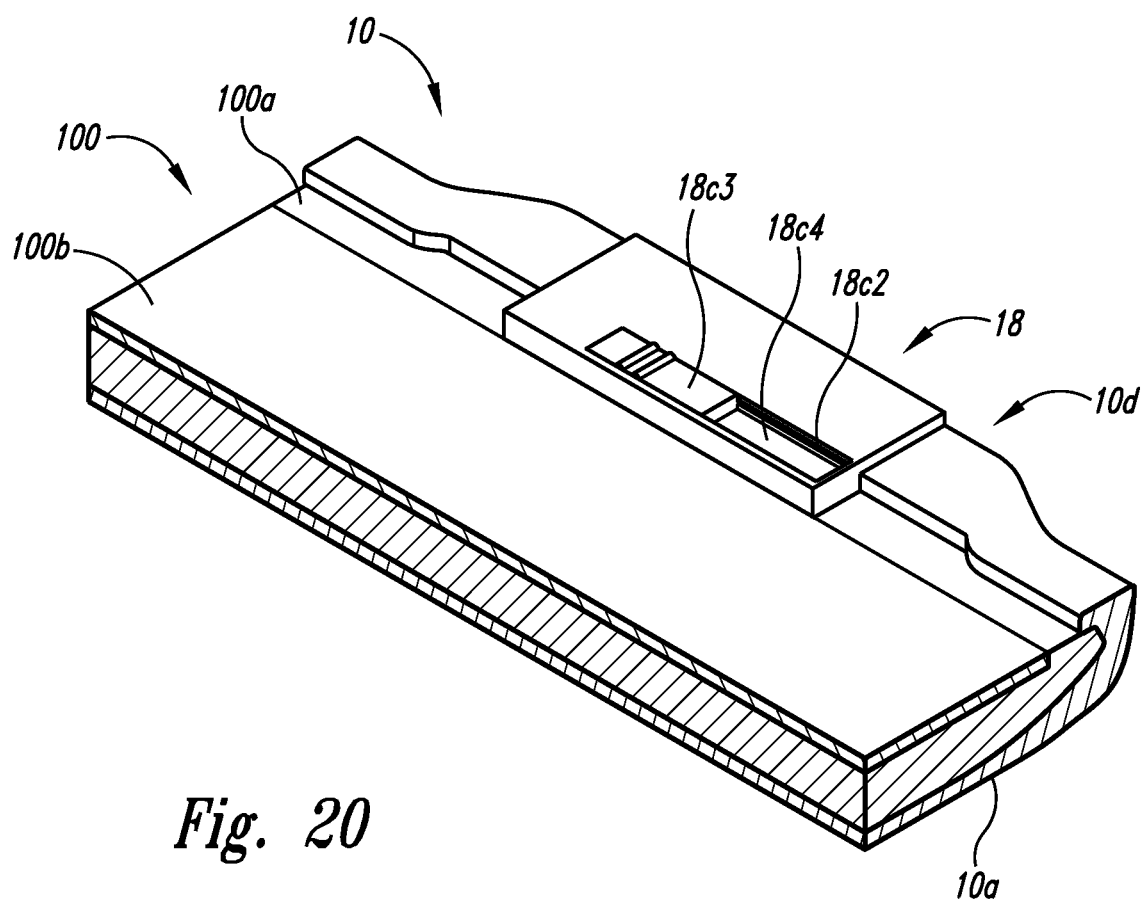
FIG. 20 is a bottom perspective view of the computing device case portion of FIG. 4 with a camera privacy assembly of FIG. 18 coupled therewith with the sliding cover 18c3 of FIG. 19 in a closed position.

Turning to FIG. 19, depicted therein is a bottom perspective view of the computing device case portion 10 coupled with camera privacy assembly 18 by connection aperture 10d2 and connection aperture 10d3 of the computing device case portion 10 receiving engagement projection 18d and engagement projection 18e of camera privacy assembly 18, respectively. The aperture system 18c of camera privacy assembly 18 is shown to include sliding cover 18c3 in an open position to allow for audio microphone 100a1 and camera 100a2 of portable electronic computing device 100 to be accessed. Turning to FIG. 20, depicted therein is a bottom perspective view of the computing device case portion 10 with camera privacy assembly 18 coupled therewith with its sliding cover 18c3 in a closed position.

Figure 21:
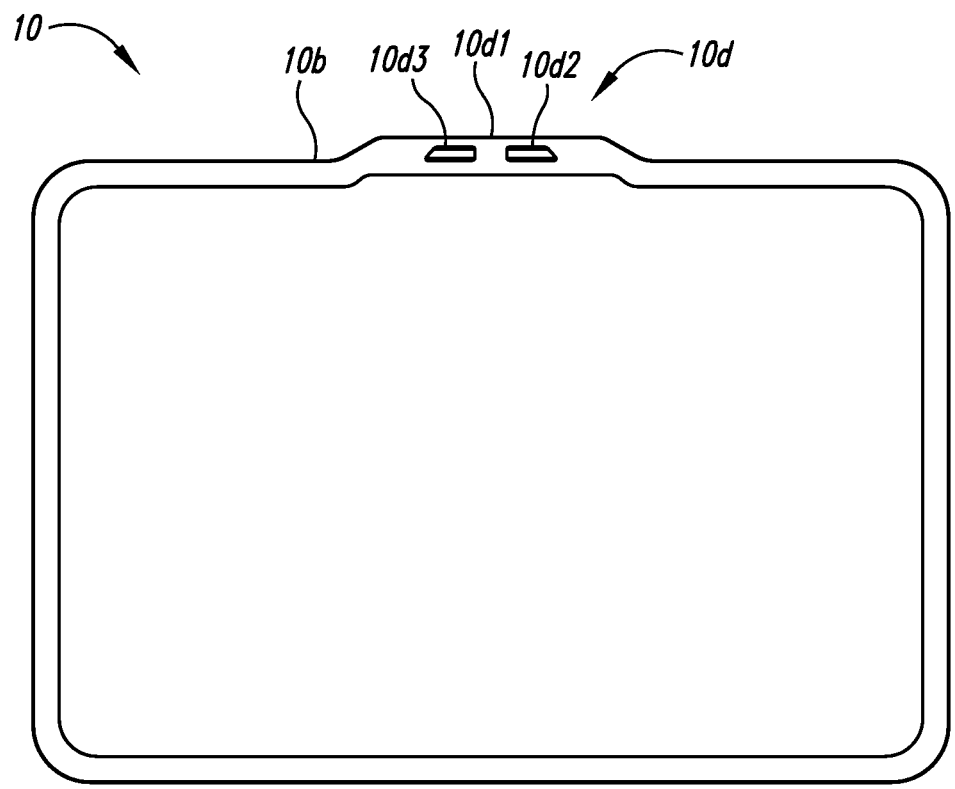
FIG. 21 is a top plan view of a tablet case with the connection portion of FIG. 1.
Figure 22:
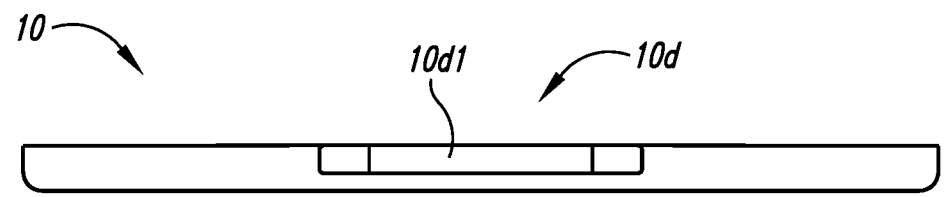
FIG. 22 is a front elevational view of the tablet case of FIG. 21.

Turning to FIG. 21, depicted therein is a top plan view of a tablet case shown to include the computing device portion 10 with the connection portion 10d. Turning to FIG. 22, depicted therein is a front elevational view of the tablet case of FIG. 21.

Figure 23:
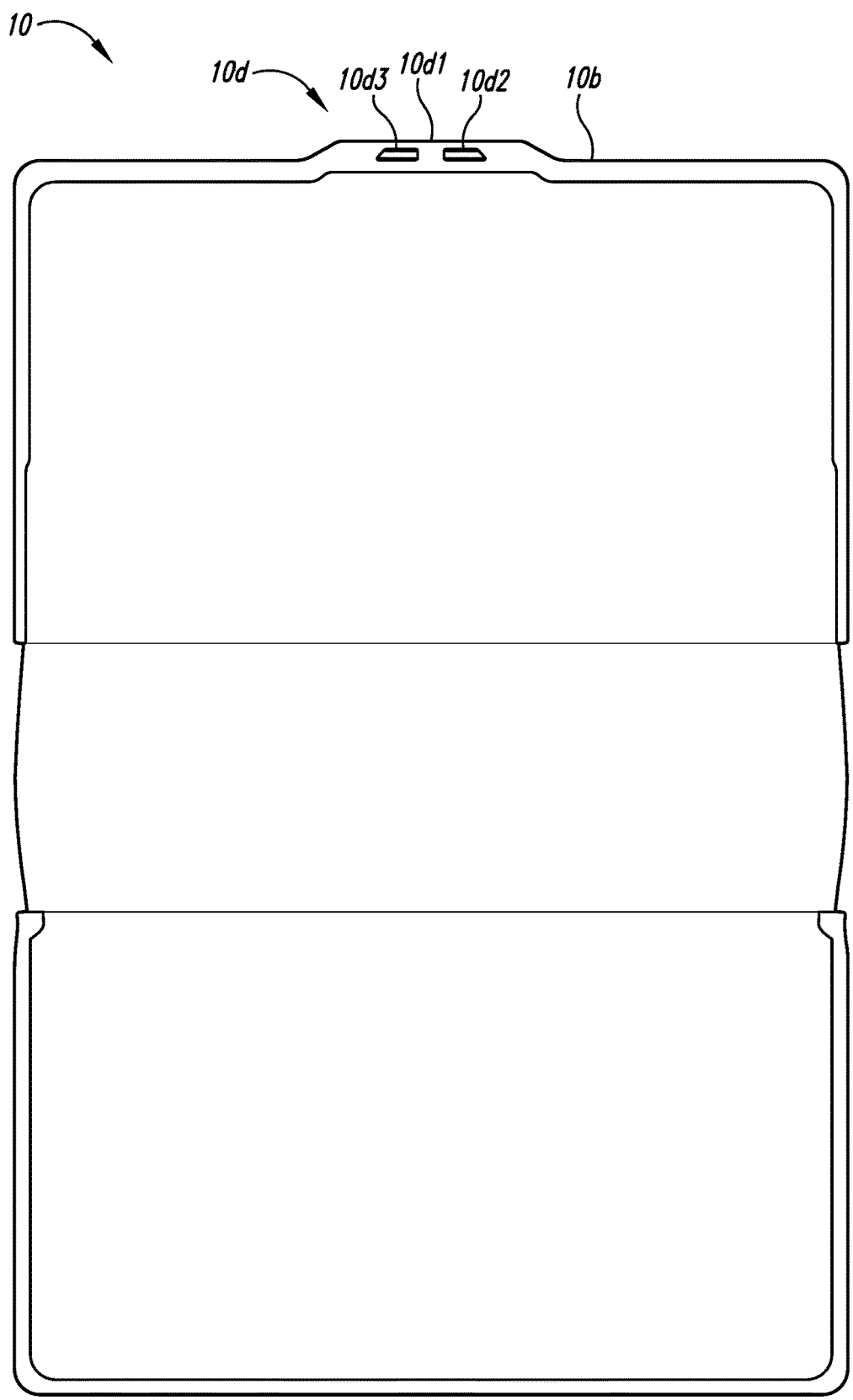
FIG. 23 is a top plan view of a lap top case with the connection portion of FIG. 1.
Figures 24, 25:
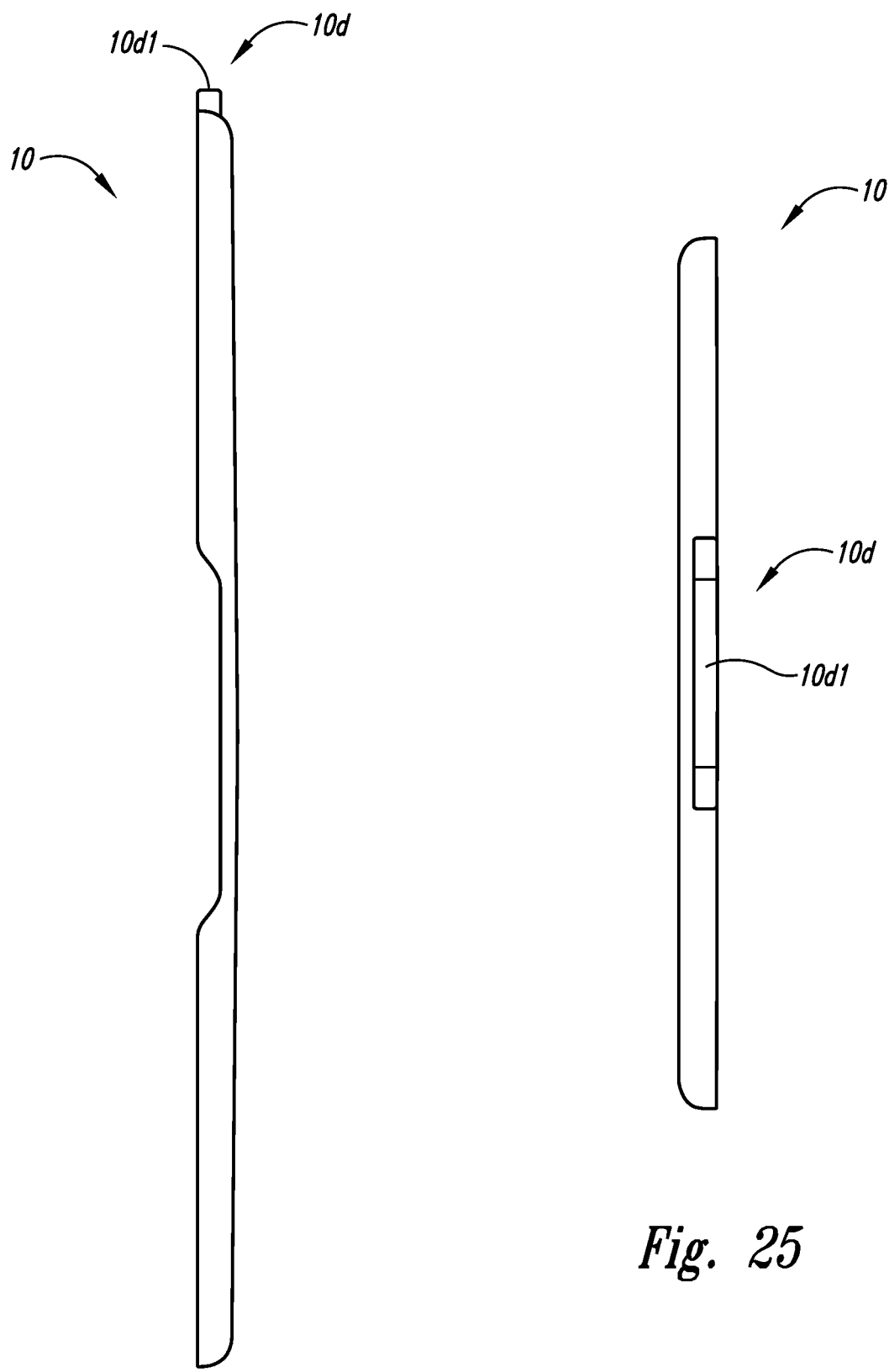
FIG. 24 is a side elevational view of the lap top case of FIG. 23.
FIG. 25 is a front elevational view of the lap top case of FIG. 23.

Turning to FIG. 23, depicted therein is a top plan view of a lap top case shown to include the computing device portion 10 with the connection portion 10d. Turning to FIG. 24, depicted therein is a side elevational view of the lap top case of FIG. 23. Turning to FIG. 25, depicted therein is a front elevational view of the lap top case of FIG. 23.

As shown by one or more of FIGS. 1-13, implementations of stylus coupling assembly 11 can couple at least one stylus-shaped computer input device 110 to at least one computing device case portion 10, the stylus coupling assembly 11 can include stylus retention component 12, which can be couplable with the stylus-shaped computer input device 110; and can include engagement component 14, which can include engagement projection 14d, which can be couplable with the stylus retention component 12 and with the computing device case portion 10.

In implementations, the stylus retention component 12 can include elongated hollow member 12a, which can include opening 12a1, which can be sized to receive at least one stylus-shaped computer input device 110.

In implementations, the elongated hollow member 12a of the stylus retention component 12 can include elongated rib member 12a3 and interior surface 12a2, the elongated rib member 12a3 can be extended from the interior surface 12a2 along a longitudinal direction of the elongated hollow member 12a.

In implementations, the elongated hollow member 12a of the stylus retention component 12 can include elongated groove 12a5, which can be extended from the interior surface 12a2 along a longitudinal direction of the elongated hollow member 12a.

In implementations, the stylus retention component 12 can include interfacial surface 12b2 and receiving aperture 12b5, which can be extended between the elongated groove 12a5 of the elongated hollow member 12a and the interfacial surface 12b2.

In implementations, the interfacial surface 12b2 of the stylus retention component 12 is shaped to conform with at least one surface of the at least one computing device case portion 10. The interfacial surface 12b2 of the stylus retention component 12 includes by is not limited to a substantially planar surface.

In implementations, the engagement component 14 of the stylus coupling assembly 11 can include elongated member 14a, which can be shaped and sized to be received by the elongated groove 12a5 of the stylus retention component 12.

In implementations, the elongated member 14a of the engagement component 14 can include elongated surface 14a1 and the interior surface 12a2 of the elongated hollow member 12a can include a radius of curvature. The elongated surface 14a1 of the elongated member 14a can include a first radius of curvature, and wherein the interior surface 12a2 of the elongated hollow member 12a can include a second radius of curvature, the first radius of curvature of the elongated surface 14a1 of the elongated member 14a can be substantially equal to the second radius of curvature of the interior surface 12a2 of the elongated hollow member 12a.

In implementations, the elongated member 14a of the engagement component 14 can include a first longitudinal length dimension, the elongated member 14a, which can be shaped to extend substantially along the first longitudinal length dimension. The engagement component 14 can include engagement projection 14d, which can extend from the elongated member 14a along a second length dimension substantially perpendicular to the first longitudinal length dimension of the elongated member 14a.

In implementations, the receiving aperture 12b5 of the stylus retention component 12 can be sized and shaped to receive the engagement projection 14d to extend through the receiving aperture 12b5 along a third longitudinal length dimension of the receiving aperture 12b5. The second longitudinal length dimension of the engagement projection 14d can be greater than the third longitudinal length dimension of the receiving aperture 12b5 to allow for a portion of the engagement projection 14d to extend past the interfacial surface 12b2 of the stylus retention component 12, the engagement projection 14d can be configured to couple with the computing device case portion 10.

In implementations, the engagement projection 14d of the engagement component 14 can include stem 14d1 and can include notch 14d4, the notch 14d4 can extend substantially perpendicularly from the interfacial surface 14a2 of the elongated member 14a along a length dimension greater than or equal to the third longitudinal length dimension of the receiving aperture 12b5.

In implementations, the engagement projection 14d of the engagement component 14 can include stem 14d1, which can include beveled end 14d2 with orthogonal extension 14d3 being perpendicular to stem 14d1.

In implementations, the stylus retention component 12 can be made from at least one material having a property of hardness that can be measured to be at least one first hardness measurement value and the engagement component 14 can be made from at least one material having a property of hardness that can be measured to be at least one second hardness measurement value, the at least one first hardness measurement value being smaller than the at least one second hardness measurement value.

In implementations, the stylus retention component 12 can be made from at least one silicone material and the engagement component 14 can be made from at least one polycarbonate material.

In implementations, the stylus retention component 12 can include interfacial surface 12b2 and guide aperture 12b3, which can be extended a first length dimension between elongated groove 12a5 of elongated hollow member 12a and interfacial surface 12b2, and wherein the engagement component 14 can include elongated member 14a and guide peg 14b. The guide peg 14b can extend longitudinally from the elongated member 14a a second length dimension. The first length dimension of the guide aperture 12b3 can be greater than or equal to the second length dimension of the guide peg 14b. The guide aperture 12b3 can be sized and positioned to receive the guide peg 14b as the stylus retention component 12 is being coupled with the engagement component 14.

The elongated hollow member 12a can be substantially cylindrical in shape.

Implementations of stylus retention component 12 can be for coupling with at least one stylus-shaped computer input device 110 and for coupling with engagement component 14, which can include engagement projection 14d.

The stylus retention component 12 can include elongated hollow member 12a, which can include opening 12a1, which can be sized to receive the stylus-shaped computer input device 110. The elongated hollow member 12a can include interior surface 12a2, which can include elongated groove 12a5.

In implementations, the stylus retention component 12 can include receiver portion 12b, which can include receiving aperture 12b5 and interfacial surface 12b2, wherein the receiving aperture 12b5 can extend between the elongated groove 12a5 of the elongated hollow member 12a and the interfacial surface 12b2 of the elongated hollow member 12a. The receiving aperture 12b5 can be sized to receive the engagement projection 14d of the engagement component 14.

Implementations of engagement component 14 can be for coupling with stylus retention component 12 and for coupling with at least one stylus-shaped computer input device 110. The stylus retention component 12 can include elongated hollow member 12a and receiver portion 12b. The elongated hollow member 12a can include opening 12a1 and interior surface 12a2. The interior surface 12a2 can include elongated groove 12a5. The receiver portion 12b can include interfacial surface 12b2 and receiving aperture 12b5, which can extend from elongated groove 12a5 of elongated hollow member 12a to interior surface 12a2 of receiver portion 12b.

In implementations, the engagement component 14 can include elongated member 14a, which can include elongated surface 14a1 and interfacial surface 14a2. The elongated member 14a can extend substantially along a first longitudinal length dimension. The elongated member 14a can be sized and shaped to be received by the elongated groove 12a5 of the at least one elongated hollow member 12a.

In implementations, the engagement component 14 can include engagement projection 14d, which can extend from the elongated member 14a along a second length dimension substantially perpendicular to the first longitudinal length dimension of the elongated member 14a. The engagement projection 14d can be sized and shaped to be received by and extend through the receiving aperture 12b5 of the stylus retention component 12.

As shown by one or more of FIGS. 1-25, implementations of an accessory coupling system can couple at least one accessory (such as the stylus coupling assembly 11, or the label assembly 16, or the camera privacy assembly 18) to computing device case portion 10. The accessory coupling system can include connection portion 10d, which can be affixed with the computing device case portion 10; and can include an engagement component 14, which can include engagement projection 14d. The engagement projection 14d can be couplable with the connection portion 10d, which can be affixed with the computing device case portion 10.

In implementations, the connection portion 10d can be affixed with the computing device case portion 10 by being molded with the computing device case portion 10 with the material of the connection portion 10d being of the material of the computing device case portion 10.

In implementations, the connection portion 10d can be affixed with the computing device case portion 10 by being co-molded with the computing device case portion 10 with the material of the connection portion 10d being different than the material of the computing device case portion 10.

In implementations, the connection portion 10d can be affixed with the computing device case portion 10 by being co-molded with the computing device case portion 10 with the material of the connection portion 10d being silicone and the material of the computing device case portion 10 being polycarbonate.

In implementations, the connection portion 10d can be affixed with the computing device case portion 10 by being glued to the computing device case portion 10 with an adhesive glue.

In implementations, the computing device case portion 10 can include an exterior side surface 10b. The connection portion 10d can be positioned to project from the exterior side surface 10b as a ledge-shaped structure.

In implementations, the connection portion 10d can include connection aperture 10d2 having a substantially elongated profile.

In implementations, engagement projection 14d of engagement component 14 can include stem 14d1, beveled end 14d2 of stem 14d1, and orthogonal extension 14d3, which can extend substantially orthogonally from stem 14d1.

In implementations, stem 14d1, beveled end 14d2 and orthogonal extension 14d3 of engagement projection 14d of the engagement component 14 can be shaped and positioned to couple with connection aperture 10d2 of connection portion 10d by or more portions of stem 14d1 of beveled end 14d2. orthogonal extension 14d3 can be capable of passing at least partially into connection aperture 10d2 of connection portion 10d.

In implementations, the accessory coupling system can include stylus retention component 12, which can include elongated hollow member 12a being sized and shaped to receive stylus-shaped computer input device 110 and engagement component 14 can be coupled to the stylus retention component 12.

In implementations, the elongated hollow member 12a of the stylus retention component 12 can include receiving aperture 12b5 being sized and shaped to receive engagement projection 14d of engagement component 14 for coupling of stylus retention component 12 with engagement component 14.

In implementations the accessory coupling system can include label assembly 16, which can label member 16a, which can include label surface 16a1. The label surface 16a1 can be sized and shaped for presentation including but not limited to alpha-numeric characters. The label member 16a can be coupled with engagement projection 16b.

In implementations, the label member 16a can be molded with engagement projection 16b as a single piece.

In implementations, the accessory coupling system can include camera privacy assembly 18, which can include privacy panel 18a. The privacy panel 18a can be coupled to and can extend substantially perpendicular from engagement projection 16b.

In implementations, privacy panel 18a can include sliding cover 18c3. The privacy panel 18a can be coupled to and extend substantially perpendicular to engagement projection 16b.

In implementations, connection portion 10d can be made from material having a property of hardness that can be measured to be no greater than a first hardness measurement value and engagement component 14 can be made from material having a property of hardness that can be measured to be no smaller than a second hardness measurement value, the first hardness measurement value being smaller than the second hardness measurement value.

In implementations, computing device case portion 10 can be for coupling with engagement component 14. The engagement component 14 can include engagement projection 14d. The computing device case portion 10 can include connection portion 10d; and exterior side surface 10b. The connection portion 10d can be positioned to project from the exterior side surface 10b as a ledge-shaped structure to couple with the engagement component 14.

In implementations, connection portion 10d can include connection aperture 10d2, which can have a substantially elongated profile to receive engagement projection 14d for coupling with the engagement component 14.

In implementations, engagement component 14 can be for coupling with connection aperture 10d2 of a computing device case portion 10. The engagement component 14 can include engagement projection 14d, which can include stem 14d1, beveled end 14d2 of stem 14d1, and orthogonal extension 14d3, which can extend substantially orthogonally from stem 14d1. The engagement projection 14d can be sized and shaped to be couplable with connection aperture 10d2 of the computing device case portion 10.

In implementations, stem 14*d*1, beveled end 14*d*2 and orthogonal extension 14*d*3 of engagement projection 14*d* of the engagement component 14 can be shaped and positioned to couple with connection aperture 10*d*2 of connection portion 10*d* by portions of stem 14*d*1, of beveled end 14*d*2 and orthogonal extension 14*d*3 being capable of passing at least partially into connection aperture 10*d*2 of connection portion 10*d*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An accessory coupling system comprising:
    a computing device case for containing a computing device, the computing device case including in its entirety
    at least one connection portion including at least one aperture, the at least one aperture including a longitudinal dimension, a first entry position, and a second entry position positioned oppositely across the at least one aperture from the first entry position, the at least one aperture extending along the longitudinal dimension from the first entry position to the second entry position, and
    a remainder of the computing device case, the at least one connection portion being affixed with the remainder of the computing device case; and
    at least one engagement component including
    a member and
    at least one engagement projection extending from the member, the at least one engagement projection including a stem and a barb, the at least one engagement projection being couplable with the at least one connection portion as
    the stem of the at least one engagement projection is positioned in the at least one aperture along the longitudinal dimension from the first entry position to the second entry position of the at least one aperture,
    the member is positioned outside of the at least one aperture nearer the first entry position of the at least one aperture,
    at least one surface portion of the member being adjacent an exterior surface of the at least one engagement component, and
    the barb is positioned outside of the at least one aperture adjacent the second entry position of the at least one aperture,
    at least one surface portion of the barb being adjacent an exterior surface of the at least one engagement component, the at least one connection portion extending away from the remainder of the computer device case such that the remainder of the computer device is unobstructive of a view unimpeded by the remainder of the computer device through the at least one aperture regardless of whether the view is taken from a position nearer the first entry position or from a position nearer the second entry position, and
    regardless of distance from the computer device case the view is taken.

2. The accessory coupling system of claim 1 wherein the at least one connection portion is affixed with the remainder of the computing device case by being molded with the remainder of the computing device case, the material of the at least one connection portion being of the material of the remainder of the computing device case.

3. The accessory coupling system of claim 1 wherein the at least one connection portion is affixed with the remainder of the computing device case by being co-molded with the remainder of the computing device case, the material of the at least one connection portion being different than the material of the remainder of the computing device case.

4. The accessory coupling system of claim 3 wherein the at least one connection portion is affixed with the remainder of the computing device case by being co-molded with the remainder of the computing device case, the material of the connection portion being silicone and the material of the remainder of the computing device case being polycarbonate.

5. The accessory coupling system of claim 1 wherein the at least one connection portion is being affixed with the remainder of the computing device case by being glued to the remainder of the computing device case with an adhesive glue.

6. The accessory coupling system of claim 1 wherein the remainder of the computing device case includes an exterior side surface, the at least one connection portion being positioned to project from the exterior side surface as a ledge-shaped structure.

7. The accessory coupling system of claim 1 wherein the at least one aperture of the at least one connection portion includes a substantially elongated profile.

8. The accessory coupling system of claim 7 wherein the at least one engagement projection of the at least one engagement component includes at least one beveled end of the at least one stem.

9. The accessory coupling system of claim 8 wherein the at least one stem, the at least one beveled end and the at least one orthogonal extension of the at least one engagement projection of the at least one engagement component being shaped and positioned to couple with the at least one connection aperture of the at least one connection portion by at least one or more portions of the at least one stem, of the at least one beveled end and the at least one orthogonal extension being capable of passing at least partially into the at least one connection aperture of the at least one connection portion.

10. The accessory coupling system of claim 1 the member of the at least one engagement component includes a stylus retention component including an elongated hollow member being sized and shaped to receive a stylus-shaped computer input device, the at least one engagement component being coupled to the stylus retention component.

11. The accessory coupling system of claim 10 wherein the elongated hollow member of the stylus retention component includes at least one receiving aperture being sized and shaped to receive the at least one engagement projection of the at least one engagement component for coupling of the stylus retention component with the at least one engagement projection.

12. The accessory coupling system of claim 1 the member of the at least one engagement component includes a label assembly including a label member, the label member including a label surface, the label surface being sized and shaped for presentation of including alpha-numeric characters, the label member being coupled with the at least one engagement projection.

13. The accessory coupling system of claim 12 wherein the label member being molded with the at least one engagement projection as a single piece.

14. The accessory coupling system of claim 1 the member of the at least one engagement component includes a camera privacy assembly including a privacy panel, the privacy panel being coupled to and extending substantially perpendicular from the at least one engagement projection.

15. The accessory coupling system of claim 14 wherein the privacy panel includes a sliding cover, the privacy panel being coupled to and extending substantially perpendicular to the at least one engagement projection.

16. The accessory coupling system of claim 1 wherein the at least one connection portion is made from at least one material having a property of hardness that can be measured to be no greater than a first hardness measurement value and the at least one engagement component is made from at least one material having a property of hardness that can be measured to be no smaller than a second hardness measurement value, the first hardness measurement value being smaller than the second hardness measurement value.

17. An accessory coupling system comprising:
a computing device case for containing a computing device, the computing device case including in its entirety
at least one connection portion including at least one aperture, the at least one aperture including a longitudinal dimension, a first entry position, and a second entry position positioned oppositely across the at least one aperture from the first entry position, the at least one aperture extending along the longitudinal dimension from the first entry position to the second entry position, and
a remainder of the computing device case, the at least one connection portion being affixed with the remainder of the computing device case; and
at least one engagement component including
a member and
at least one engagement projection extending from the member, the at least one engagement projection including a stem and a barb, the at least one engagement projection being couplable with the at least one connection portion as
the stem of the at least one engagement projection is positioned in the at least one aperture along the longitudinal dimension from the first entry position to the second entry position of the at least one aperture,
the member is positioned outside of the at least one aperture nearer the first entry position of the at least one aperture,
the member including a first cross-sectional area having its normal parallel with the longitudinal dimension of the at least one aperture, the first cross-sectional area being greater than the cross-sectional area of the at least one aperture, and
the barb is positioned outside of the at least one aperture adjacent the second entry position of the at least one aperture,
barb including a second cross-sectional area having its normal parallel with the longitudinal dimension of the at least one aperture, the second cross-sectional area being greater than the cross-sectional area of the at least one aperture, the at least one connection portion extending away from the remainder of the computer device case such that the remainder of the computer device is unobstructive of a view unimpeded by the remainder of the computer device through the at least one aperture regardless of whether the view is taken from a position nearer the first entry position or from a position nearer the second entry position, and regardless of distance from the computer device case the view is taken.

18. The computing device case portion of claim 17 wherein the at least one aperture of the at least one connection portion includes a substantially elongated profile.

19. An accessory coupling system comprising:
(I) a computing device case for containing a computing device, the computing device case including in its entirety at least one connection portion including at least one aperture, the at least one aperture including a longitudinal dimension, a first entry position, and a second entry position positioned oppositely across the at least one aperture from the first entry position, the at least one aperture extending along the longitudinal dimension from the first entry position to the second entry position, and a remainder of the computing device case, the at least one connection portion being affixed with the remainder of the computing device case; and at least one engagement component including a member and at least one engagement projection, from the member, the at least one engagement projection including a stem and a barb, being couplable with the at least one connection portion as the stem of the at least one engagement projection is positioned in the at least one aperture along the longitudinal dimension from the first entry position to the second entry position of the at least one aperture, the member is positioned outside of the at least one aperture nearer the first entry position of the at least one aperture, at least one surface portion of the member being adjacent an exterior surface of the at least one engagement component, and the barb is positioned outside of the at least one aperture adjacent the second entry position of the at least one aperture, at least one surface portion of the barb being adjacent an exterior surface of the at least one engagement component, the at least one connection portion extending away from the remainder of the computer device case such that the remainder of the computer device is unobstructive of a view unimpeded by the remainder of the computer device through the at least one aperture from a top plan view of the computer device case and from a bottom plan view of the computer device case.

20. The engagement component of claim 19 wherein the stem of the at least one engagement projection includes at least one beveled end and at least one orthogonal extension being shaped and positioned to couple with the at least one aperture of the at least one connection portion by at least one or more portions of the at least one beveled end and the at least one orthogonal extension being capable of passing at least partially into the at least one aperture of the at least one connection portion.

* * * * *